(12) United States Patent
Ayyagari et al.

(10) Patent No.: US 7,079,508 B2
(45) Date of Patent: Jul. 18, 2006

(54) QUALITY OF SERVICE OVER PATHS HAVING A WIRELESS-LINK

(75) Inventors: Arun Ayyagari, Seattle, WA (US); Yoram Bernet, Seattle, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 09/792,765

(22) Filed: Feb. 22, 2001

(65) Prior Publication Data

US 2001/0024434 A1  Sep. 27, 2001

Related U.S. Application Data

(60) Provisional application No. 60/184,290, filed on Feb. 23, 2000.

(51) Int. Cl.
*H04L 12/413* (2006.01)
*H04Q 7/00* (2006.01)

(52) U.S. Cl. .................. 370/329; 370/349; 370/447; 455/452.2

(58) Field of Classification Search ................ 370/230, 370/229, 338, 445, 448, 236, 447, 347, 329, 370/349; 709/249, 200; 455/452.2
See application file for complete search history.

(56) References Cited

U.S. PATENT DOCUMENTS

| 5,329,531 | A | * | 7/1994 | Diepstraten et al. ......... 370/347 |
| 5,572,528 | A | * | 11/1996 | Shuen ......................... 370/402 |
| 6,031,832 | A | * | 2/2000 | Turina ......................... 370/348 |
| 6,069,882 | A | * | 5/2000 | Zellner et al. ............... 370/329 |
| 6,282,429 | B1 | * | 8/2001 | Baiyor et al. ............... 455/512 |
| 6,522,661 | B1 | * | 2/2003 | Min .............................. 370/445 |
| 6,553,006 | B1 | * | 4/2003 | Kalliokulju et al. ......... 370/310 |
| 6,714,987 | B1 | * | 3/2004 | Amin et al. .................. 709/249 |
| 6,721,331 | B1 | * | 4/2004 | Agrawal et al. ............. 370/448 |
| 6,738,361 | B1 | * | 5/2004 | Immonen et al. ............ 370/328 |

FOREIGN PATENT DOCUMENTS

WO   WO 99/21313 A2   4/1999

(Continued)

OTHER PUBLICATIONS

Sobrinho, Joāo L., et al., Quality-of-Service in Ad Hoc Carrier Sense Multiple Access Wirelss Networks, *IEEE Journal on Selected Areas in Communications*, 17(8):353-1368, (Aug. 1999).

(Continued)

*Primary Examiner*—Alpus H. Hsu
(74) *Attorney, Agent, or Firm*—Wolf, Greenfield, & Sacks, P.C.

(57) ABSTRACT

The invention provides Quality of Service assurances in a manner expected in other media to communications over paths that include one or more wireless links. The invention combines a subnet bandwidth manager ("SBM") at an access point ("AP") to track allocations of wireless bandwidth. The invention further incorporates multiple priority levels for packet transmission in a two-prong stochastic scheme. The first prong reserves bandwidth at each of the intermediate nodes in a transmission path subject to a veto by any intermediate node. The second prong modulates the transmission probability of a packet based on the previous failed attempts at transmission and the priority level of the packet. The overall result of this hybrid scheme is to not shut out users with the lowest priority, e.g., "best effort" priority, while assuring adequate bandwidth to higher priority applications.

29 Claims, 6 Drawing Sheets

FOREIGN PATENT DOCUMENTS

| WO | WO 99/33301 A1 | 7/1999 |
| WO | WO 99/39480 A2 | 8/1999 |
| WO | WO 99/50999 A1 | 10/1999 |
| WO | WO 00/10357 A1 | 2/2000 |

OTHER PUBLICATIONS

Weinmiller, Jost, et al., Analyzing and Improving the IEEE 802.11-MAC Protocol for Wireless LANs, in the *IEEE Proceedings of MASCOTS* 1996, pp. 200-206.

O'hara et al., "The IEEE 802.11 Handbook: A Designer's Companion," *Standards Information Network, IEEE Press*, Copyright © 2001 (174 pages).

Durham et al., "Inside the Internet's Resource reSerVation Protocol: Foundations for Quality of Service," *Wiley Computer Publishing*, Copyright © 1999 (363 pages).

"Whitecap ™ network protocols," retrieved from http://www.sharewave.com/Products/WhiteCap/whitecap.html on Nov. 21, 2000 (12 pages).

"Quality of Service Technical Overview," Microsoft Windows 2000 Server, retrieved from http://www.microsoft.com/windows2000/library/howitworks/communications/traffi.../qos.as on Mar. 29, 2001 (6 pages).

Bernet, "The Complementary Roles of RSVP and Differentiated Services in the Full-Service QoS Network," *IEEE Communications Magazine*, Feb. 2000, pp. 154-162.

"QoS: Assigning Priority in IEEE 802-style Networks," *Microsoft Windows Device Fundamentals > Networking and Communications*, retrieved from http://www.microsoft.com/whdc/device/network/qos/qos.mspx?pf=true on Oct. 20, 2004 (3 pages).

"SpectraLink Voice Priority," *SpectraLink Wireless@work™*, © Copyright 2000 SpectraLink Corporation (2 pages).

Yavatkar et al., "SBM (Subnet Bandwidth Manager); A Protocol for RSVP-based Admission Control over IEEE 802-style networks," RFC 2814, retrieved from http://www.ietf.org/rfc/rfc2814.txt?number=2814 on Oct. 15, 2004 (57 pages).

Braden et al., "Resource ReSerVation Protocol (RSVP)—Version 1 Functional Specification" RFC 2205, retrieved from http://www.ietf.org/rfc/rfc2205.txt?number=2205 on Oct. 15, 2004 (105 pages).

"Information technology—Telecommunications and information exchange between systems—Local and metropolitan area networks—Specific requirements—Part 11:Wireless LAN Medium Access Control (MAC) and Physical Layer (PHY) Specifications," *ANSI/IEEE std 802.11, 1999 Edition* (512 pages).

* cited by examiner

QUALITY OF SERVICE OVER PATHS HAVING A WIRELESS-LINK

CROSS-REFERENCE TO RELATED APPLICATION

This application is related to the provisional U.S. Patent application Ser. No. 60/184,290 filed on Feb. 23, 2000.

TECHNICAL FIELD

This invention relates generally to providing Quality of Service assurances in a network having wireless links. In particular, the invention relates to providing Quality of Service assurances in networks having at least one wireless link connecting a wireless device to a LAN and/or a WAN and/or a PAN.

BACKGROUND OF THE INVENTION

Wireless devices communicate with each other either directly or via one or more base stations over a radio channel. The base station receives communications from one device and then forwards them, possibly over a network, to another device. The risk of disruption of any given wireless connection makes it difficult for a given base station to provide assurance to a communicating device that sufficient resources are available for the projected needs of the device. Moreover, wireless devices are mobile devices that are capable of moving out of range or losing signal strength due to other factors.

Many wireless devices use carrier sense multiple access with collision avoidance ("CSMA/CA") technology. In accordance with CSMA each node monitors the carrier, e.g., a radio channel of interest, to detect if any other node is transmitting prior to attempting a transmission since CSMA/CA is based on the "listen before talk" paradigm. Carrier sense wireless network nodes can sense the carrier, i.e., transmissions over the common radio channel, from a transmitter in a larger range than the range at which receivers are willing to accept a packet from that same transmitter. In addition, the range for sensing the carrier is beyond the range within which the transmitter may cause interference. The detection of a transmitting node can be actual or based on a parameter declaring the time interval for which the transmitting node intends to transmit, i.e., virtual.

Every packet is sent by a node in contention-free periods to inform other nodes of the intended transmission. In response other nodes regulate their packet transmission attempts based only on their local perception of the state—idle or busy—of the radio channel. Such sensing results in the given node waiting for the radio channel to be idle for a prescribed period of time prior to attempting transmission. Detection of transmissions by another node in the radio channel results in a node that is currently waiting to transmit entering a "backoff" state. The duration of the backoff state, representing the time for which the common radio channel is required to be idle, is preferably set using a random number selected from a range, termed contention window in the IEEE 802.11 standard specifications, determined by the prior failed attempts to transmit. See, e.g., O' Hara, Bob and Al Peterick, "IEEE 802.11 handbook: A Designer's Companion," IEEE Press New York (1999). However, CSMA/CA does not provide Quality of Service ("QoS") guarantees.

QoS refers to a reservation of resources, such as bandwidth, time slices, relative priority, memory, ports and the like that are required for the execution of a desired task in a specified time period. Default QoS level, typically termed "best effort," represents execution of a task if resources are available when needed, but not necessarily providing reservation of resources. In other words, "best effort" represents providing otherwise idle resources for carrying out the task. Higher levels of assurance provide better than "best effort" and can include several levels of relative priority as is discussed next.

Merely reserving resources such as bandwidth is not sufficient for efficiently providing QoS assurances. An added complication is the enhanced possibility of packet collisions due to two or more nodes attempting to transmit during overlapping time intervals over the common radio channel resulting in unsuccessful transmission. Packet collisions are unavoidable with wireless links connecting nodes because each node has a significantly delayed perception of other nodes' activity. Collisions also take place due to hidden nodes. For example, two transmitting nodes outside the sensing range of each other may interfere at a common receiver if they are within the sensing range of the common receiver.

Following a determination of an anticipated level of the resources required by a task, often by the task itself, it is possible to reliably request a reservation of the resources, which may be distributed, at future times. Non-exhaustive examples of tasks requiring differing levels of anticipated resource needs include transmitting a large file, providing voice links, audio-video links and real-time execution of an interactive gaming application.

New wireless applications, such as news updates, emergency services and the like may benefit from a reservation mechanism, i.e., availability of non-default QoS that ensures satisfactory functioning of real-time applications. However, due to the transient nature of wireless links, which may be a part of a larger communication path, it is difficult to reserve resources without a significant likelihood of under-utilization of the transmission medium.

Some suggestions for providing QoS over wireless links include the black-burst ("BB") contention mechanism discussed in Sobrinho, J. L. and A. S. Krishnakumar "Quality-of-Service in Ad Hoc Carrier Sense Multiple Access Wireless Networks" in *IEEE Journal on Selected Areas in Communications*, Volume 1, No. 8, 1353–1368 (1999). In accordance with BB, nodes contend for access to the common radio channel with pulses of duration proportional to the time spent waiting for the common radio channel to become idle. Id. Furthermore, BB provides priority to real-time traffic.

BB recognizes three types of links between nodes. First, a communication link between two nodes reflects successful transmission and receipt of a packet from one node to the other node. Second, an interfering link between two nodes due to transmissions from one of the nodes colliding with any other transmission to the other node during the same time interval. Finally, a sensing link between two nodes reflecting that one of the nodes can sense if the other node is transmitting. Naturally, if two nodes have a communication link between them then they also have interfering and sensing links between them.

CSMA/CA, in accordance with the IEEE 802.11 standard, allows for a backoff mode for a node that is otherwise ready for transmit a packet. A node in the backoff mode chooses a random number s uniformly distributed between zero and $\min\{32 \times 2^c - 1, 1, 255\}$, where c is the number of collisions experienced by the node since its last successful transmission. The node, then, sets a timer that counts down only while the channel has been perceived idle for more than a threshold for transmitting on the common radio channel and (re)transmits the packet when the timer reaches zero. Furthermore, a node learns of the success or failure of its transmission following reception of a positive acknowledgment scheme. The recipient of a correctly received packet sends back an acknowledgment packet within a bounded interval of time. Id.

Contention between nodes, in accordance with BB allows resolution of collisions between nodes. Nodes contend for the common radio channel prior to the time when they would be allowed to transmit. Contending nodes transmit bursts of energy (hereinafter "burst transmission") of duration proportional to the individual delay experienced by a node. Following a burst transmission a node monitors the common radio channel to determine if its burst was the longest. The successful node proceeds with its transmission while the other nodes wait to contend for the common radio channel to become idle again. The successful node also selects a future time for transmission of the next transmission. Thus, the various nodes transmit in staggered time intervals that are more likely to be collision free.

However, this scheme requires transmission of bursts of energy, an expensive scheme for devices with limited power resources. Using additional hardware and/or software to detect that such bursts are not packet transmissions is also required for implementing the BB proposal. Furthermore, the transient nature of wireless and other failure prone connections is likely to repeatedly invoke the burst mechanism to resynchronize real-time transmissions.

A further limitation of proposals for providing QoS, including BB discussed above and WHITECAP™ over transient links is the widely perceived need to extend existing standards such as IEEE 802.11. Both the BB and the WHITECAP™ proposals seek to extend existing standards. In other words, agreement has to be reached among the standards consortia members to accept a particular solution.

Furthermore, the proposed direction for standards is not efficiently addressed by the current proposals to provide QoS over wireless links. For instance the IEEE 802.1p proposal includes multiple priority levels for packet transmission—as many as eight priority levels have been proposed. Thus, QoS protocols need to accommodate several priority levels in addition to best-effort and real-time constraints in resolving collisions with the aim of honoring QoS guarantees.

SUMMARY OF THE INVENTION

The invention described herein addresses the problem of providing the Quality of Service assurances, in a manner expected in other media, to communications over paths that include one or more wireless links. The invention provides improved Quality of Service over end-to-end connections including at least one wireless link or hop by combining the subnet bandwidth manager ("SBM") with a stochastic scheme for assuring that data packets are transmitted based on priority and prior failure to transmit due to a collision. The wireless link includes an access point ("AP") having an SBM to track allocations of wireless bandwidth. The AP allows transmission in allocated time intervals to stations ("STA") that succeed in competing for the right to transmit. In effect, a two-prong resource deployment scheme is employed as described below.

The first prong includes reserving bandwidth and/or memory and additional resources for, by way of example, a prescribed time interval at each of the intermediate nodes in a transmission path. This reservation allows the STA to use an approved tag on the packets. The reservation scheme requires all intervening nodes to fail to object to the proposed reservation. The reservation further implements an SBM to account for bandwidth at each stage of the path.

The second prong includes modulating a retransmission window by a particular STA based on a previous failure to transmit due to the STA failing in an attempt to transmit. Thus, failing to transmit results in changing the retransmission window. Such a failure could be due to a collision and/or another node taking control of the carrier earlier than the particular STA.

Moreover, the stochastic scheme for managing priority does not shut out the lower priority clients, but, instead, a hybrid scheme allows them to attempt to transmit with a lower probability of being first to attempt transmission. Furthermore, a stochastic scheme for recovering from collisions allows staggering of packets having the same priority. The overall result of this hybrid scheme is to not shut out users and resolve collisions while allowing real-time services adequate bandwidth with statistically higher probability of access.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In a network connected to wireless devices there are possible paths having one or more wireless links. Providing QoS is limited by the wireless links because of the lower wireless bandwidth and higher error rates compared to a wired link. Furthermore, wireless transmission of frames over a wireless link typically requires retransmission if an acknowledgment is not received within a prescribed time period. In view of the transitory and failure-prone nature of wireless links, the overhead due to a wireless link is significantly greater than the wired link overhead.

Instead of extending or changing the wireless link containing local area network specifications, an embodiment of the disclosed invention provides QoS by implementing a subnet bandwidth manager ("SBM"). The SBM preferably conforms to existing specifications, e.g., RFC 2814, which is incorporated herein by reference in its entirety, and is in close association with the access point ("AP"). The SBM is instrumental in receiving QoS requests, generating reservation messages, also termed RSVP RESV, to request resources at each node to accommodate the requested QoS. The reservation message is sent to the next node in the path, following a reservation of the requested resources, if the current node can accommodate the requested level of QoS. If a node in the path cannot accommodate the reservation request then the reservation request is denied and returned along the path with each node freeing the previously reserved resources. In an exemplary embodiment of the invention each node need not affirmatively approve the request since failing to deny the request implies approval. Moreover, some of the nodes in the path may be managed together. In such a case the management software advantageously tracks the resource allocation using suitable bookkeeping algorithms.

The nodes defining the wireless link also support a stochastic strategy to avoid collisions by staggering the time at which a frame is transmitted. The nodes defining the wireless link generate delays in the event of collisions. For example, two nodes attempting to transmit during overlapping time periods use a random number to effect collision avoidance with little overhead. In addition, the random number range for generating a time point for transmitting is obtained by the SBM a packet such that the probability of transmitting a packet changes during a next period of time following a failure to transmit. This increase in probability may have an upper bound. Furthermore, packets with a similar priority level are queued together to ensure earlier transmission of higher priority packets than packets having lower priority.

Compatibility of the invention with existing standards is an advantage over proposals to extend various specifications due to lowered transaction costs, but it is not intended to be a limitation. The invention is intended to be operable with a wide variety of existing and future standard specifications, in part, because it combines several features in a novel manner to provide QoS. Preferably, the invention is carried out, at least in part, by programming computing devices to create a suitable computing environment. The following detailed description of the invention includes a description of a general computing environment suitable for implementing the invention.

Figure 1:
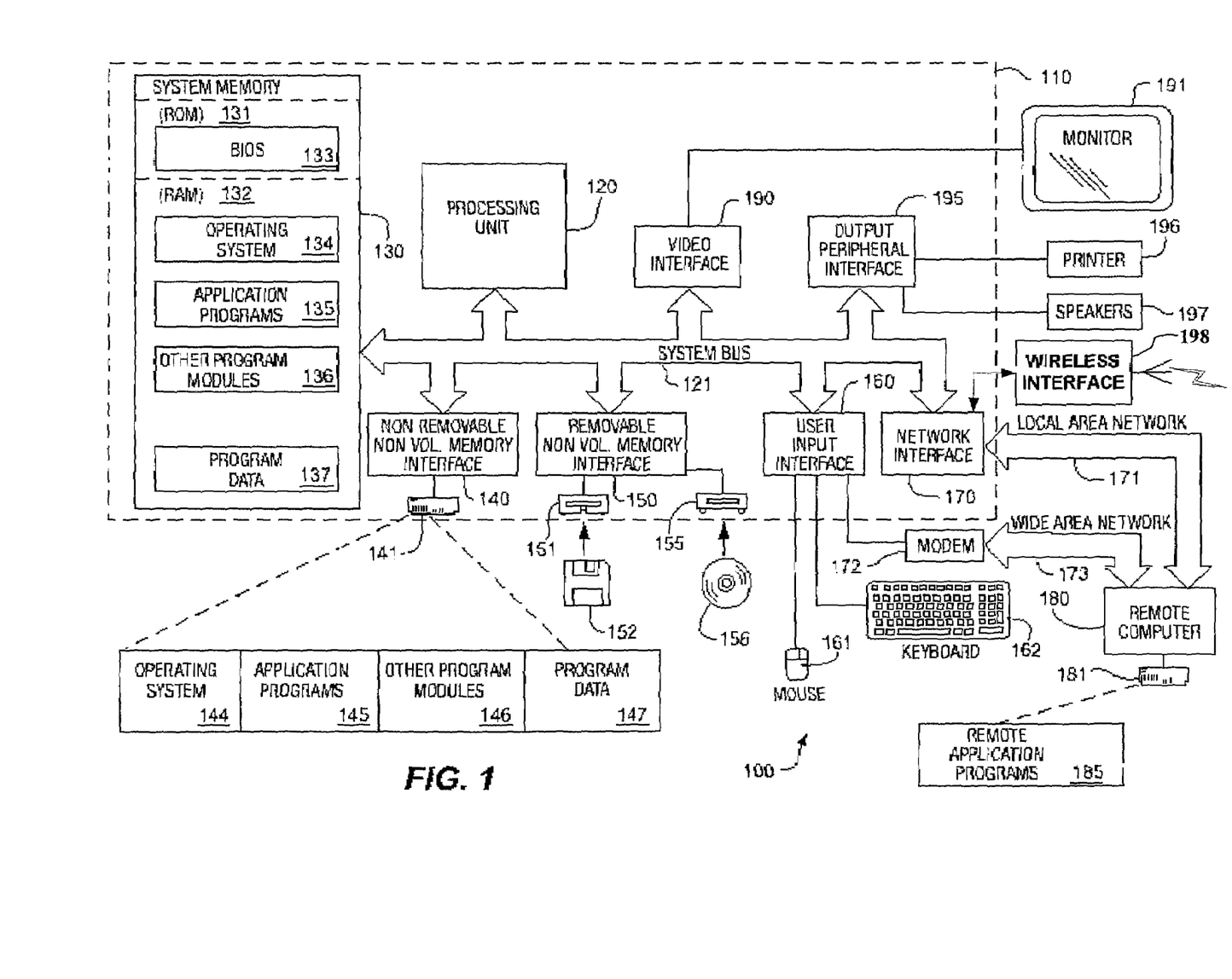
FIG. 1 is a block diagram generally illustrating an exemplary computer system on which the present invention resides.

Some of the devices, whether in the piconet or remote to the piconet, provide computing environments similar to the computing environment illustrated in FIG. 1. Of course, the invention does not require the resources and sub-devices illustrated in FIG. 1. In fact, the piconet devices will not include many of the components depicted in FIG. 1 such as a hard drive for data storage.

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an OS 134, application programs 135, other program modules 136, and program data 137. Often, the OS 134 offers services to applications programs 135 by way of one or more application programming interfaces (APIs) (not shown). Because the OS 134 incorporates these services, developers of applications programs 135 need not redevelop code to use the services. Examples of APIs provided by OSs such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151, which may be internal or external, that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141, which may be internal or external, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an OS 144, application programs 145, other program modules 146, and program data 147. Note that these components can either be the same as or different from the OS 134, application programs 135, other program modules 136, and program data 137. The OS 144, application programs 145, other program modules 146, and program data 147 are given different numbers here to illustrate that they may be different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171, personal area network (PAN) and a wide area network (WAN) 173, and at least one wireless link, for instance via wireless interface 198 complete with an antenna, but may also include other networks. Some examples of contemplated protocols include those compliant with BLUETOOTH™, UPnP™, JINI™, SALUTATION™ and IETF SLP. Such networking environments are commonplace in offices, enterprise-wide computer networks, intranets, and the Internet or are expected to be introduced in the near future.

A computing device with both wireless and LAN/PAN connectivity, as depicted in FIG. 1, is suitable for implementing a wireless link compatible with QoS assurances in accordance with the invention. However, FIG. 1 is an exemplary depiction of a wireless communication capable device and does not limit the possible embodiments of the claimed invention as is apparent to one of ordinary skill in the art.

When used in a LAN networking environment, the computer 110 is connected to the LAN 171 through a network interface or adapter 170 or a wireless transmitter. When used in a WAN networking environment, the computer 110 typically includes a modem 172, wireless antenna or other means for establishing communications over the WAN 173, such as the Internet. The familiar modem 172, which may be internal or external, may be connected to the system bus 121 via the user-input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181, which may be internal or external to the remote computer 180. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Figure 2:
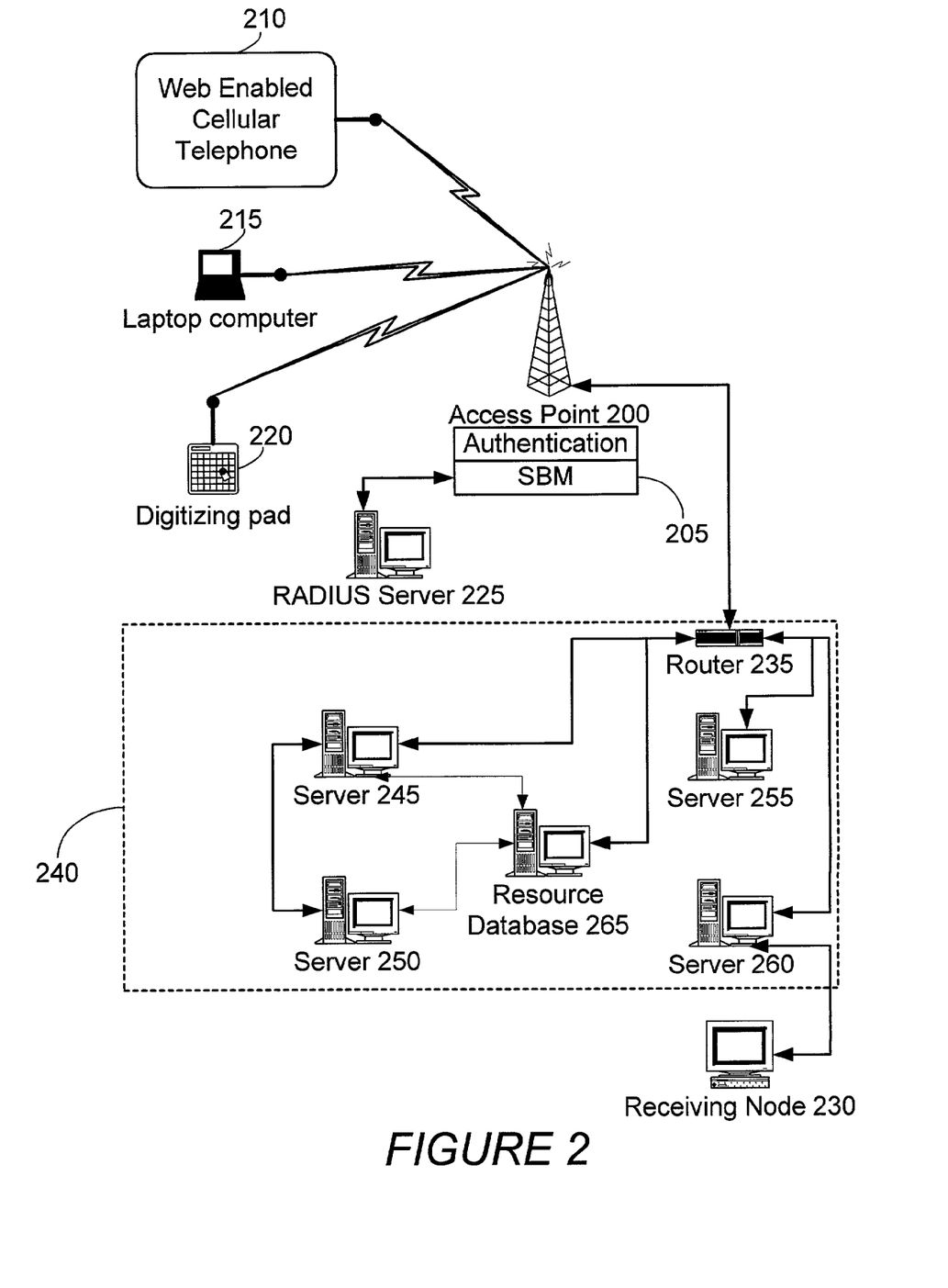
FIG. 2 is an illustration of the general computing environment in which an embodiment of the invention functions.

FIG. 2 illustrates a computing environment having an access point 200 ("AP") with a subnet bandwidth manager and authentication software 205 to control access to a network via wireless links by exemplary wireless devices, viz., web-enabled cell phone 210, laptop computer 215 and a digitizing pad 220. These devices are alternative hardware forms of the general computing system depicted in FIG. 1. The authentication software 205 of access point 200 performs authentication with the assistance of a RADIUS server 225 as is well known to those of ordinary skill in the art.

The laptop computer 215, which is one of the wireless devices 210, 215 or 220, requests access to a network to communicate, with a specified QoS specifying the required bandwidth, time constraints and the like, with a receiving node 230. In response, the access point 200 sends a message requesting QoS to a router 235. The router 235 manages packet flow through a subnet 240 to allow the requested communication access to the receiving node 230.

The message requesting QoS includes a data structure for recording the originating node, the destination node and the intermediate nodes in the path as the intermediate nodes determine the path. In this exemplary embodiment the originating node is the laptop computer 215 and the destination node is the computer 230. The aforementioned data structure allows the message to be sent back to the previous node if the current node vetoes the request for resources because the path leading to the originating node is recorded in the message. If no node vetoes the QoS request then the message returns to the laptop computer 215 with the path and the assurance that the resources for supporting the requested QoS are reserved along the path.

The router 235, in general, forwards traffic to servers 245, 250, 255 and 260. Servers 240 and 245, connected to a resource database 265, help in resource allocation for connections managed by them. It should be noted that all connections to the various nodes and servers in FIG. 2 are not shown explicitly. Although not required in general, in this exemplary embodiment of the invention the resource database 265 assists the router 235 in deciding whether sufficient resources are available to satisfy the request to access the network in order to communicate with receiving node 230 via subnet 240. In this embodiment the failure to veto the QoS request, in other words forwarding the message to the next node or the receiving node 230, implies that the requested resources are available. Alternative embodiments of the invention require affirmative assent with no loss of generality.

The router 235 forwards the message, sent by the access point 200 to the receiving node 230, to server 255 under a variety of possible implementation conditions, some of which are described herein. Server 255 forwards the packets to the receiving node 230 after determining that server 255 is on the path to the receiving point 230. In alternative embodiments of the invention, the server 255 accesses resource database 265 to determine whether sufficient resources exist to honor the requested quality of service. Furthermore, the router 235 provides a path for the packets after consulting its routing table. Determination of a segment of the path permits evaluation of the resources available to reserve resources along the path segment as a whole.

Figure 3:
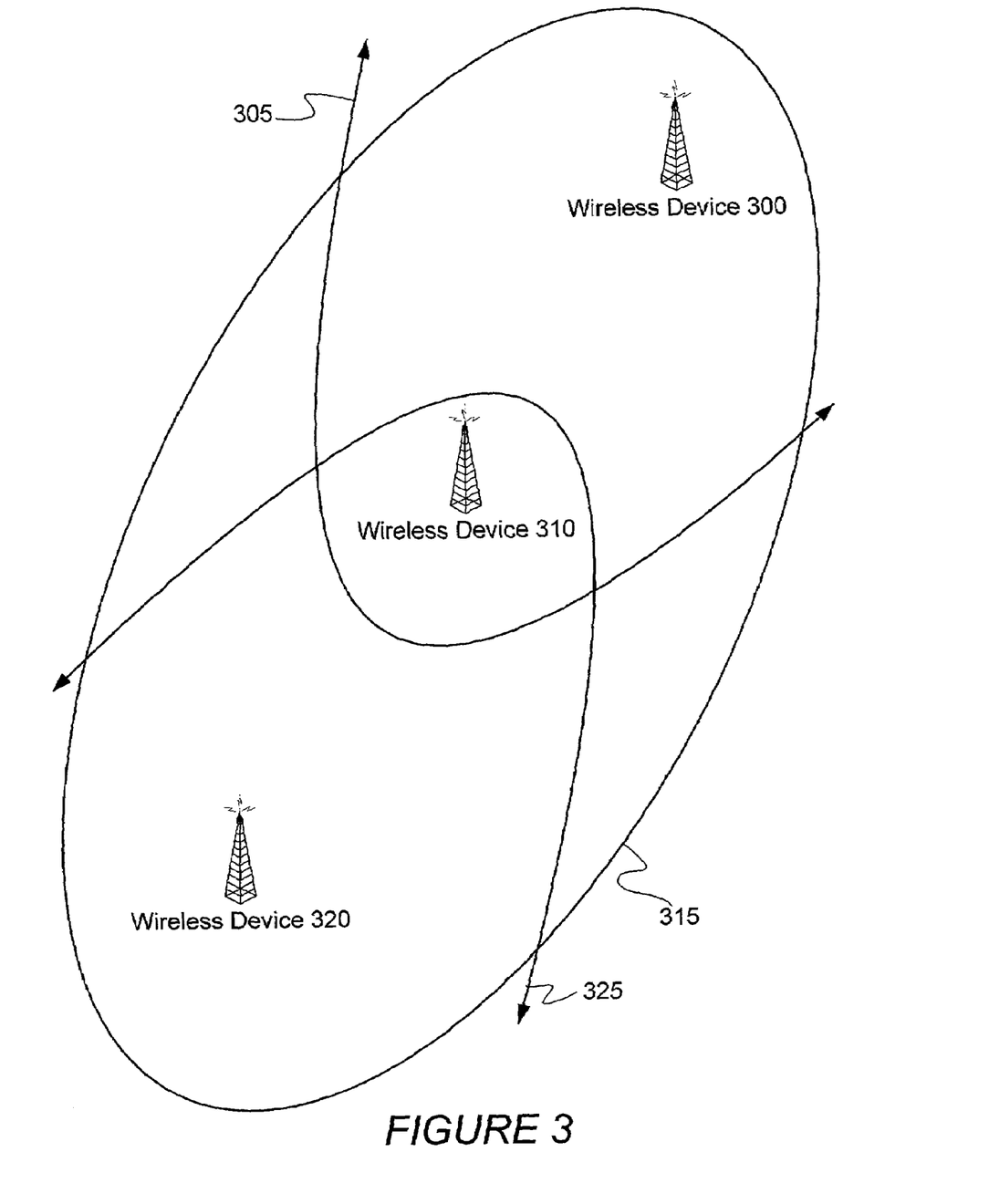
FIG. 3 illustrates unavoidable collisions between packets transmitted over wireless links.

FIG. 3 illustrates a distinguishing feature of wireless links that complicates the allocation of resources due to unavoidable collisions between packets. Wireless nodes listen first to detect idle time slices and only then try to transmit. Still, it is possible for a wireless node to receive transmissions from two or more nodes because the transmitting nodes were unaware of each other's intent to transmit. For example, wireless device 310 in the range 305 receives wireless device 310's transmissions. Similarly, wireless devices 300 and 320 in the range 315 receive wireless device 310's transmissions. On the other hand, although wireless device 310, which is in range 325 corresponding to wireless device 320, receives wireless device 320's transmissions, wireless device 300 does not receive wireless devices 320's transmissions. Moreover, the wireless devices 300 and 320 are not in each other's sensing range. Consequently, wireless devices 300 and 320 cannot monitor the medium to avoid each other.

There are several priority levels associated with packet transmission. The IEEE 802.11p specification provides eight priority levels for different tasks. Quality of Service (QoS) for transmitting a packet, specified as an assured bandwidth in a slice of time, is difficult to provide over wireless links. The difficulty is due to the heightened likelihood of collisions with wireless links and the associated overhead of overcoming collisions. It should also be noted that many transmissions requiring QoS are not real-time tasks. Thus, the probability of packet transmission for such tasks need not be as high as that required by real-time tasks. An example of such a task is file transfer in a bounded time interval, which requires non real-time QoS guarantees.

Figure 4:
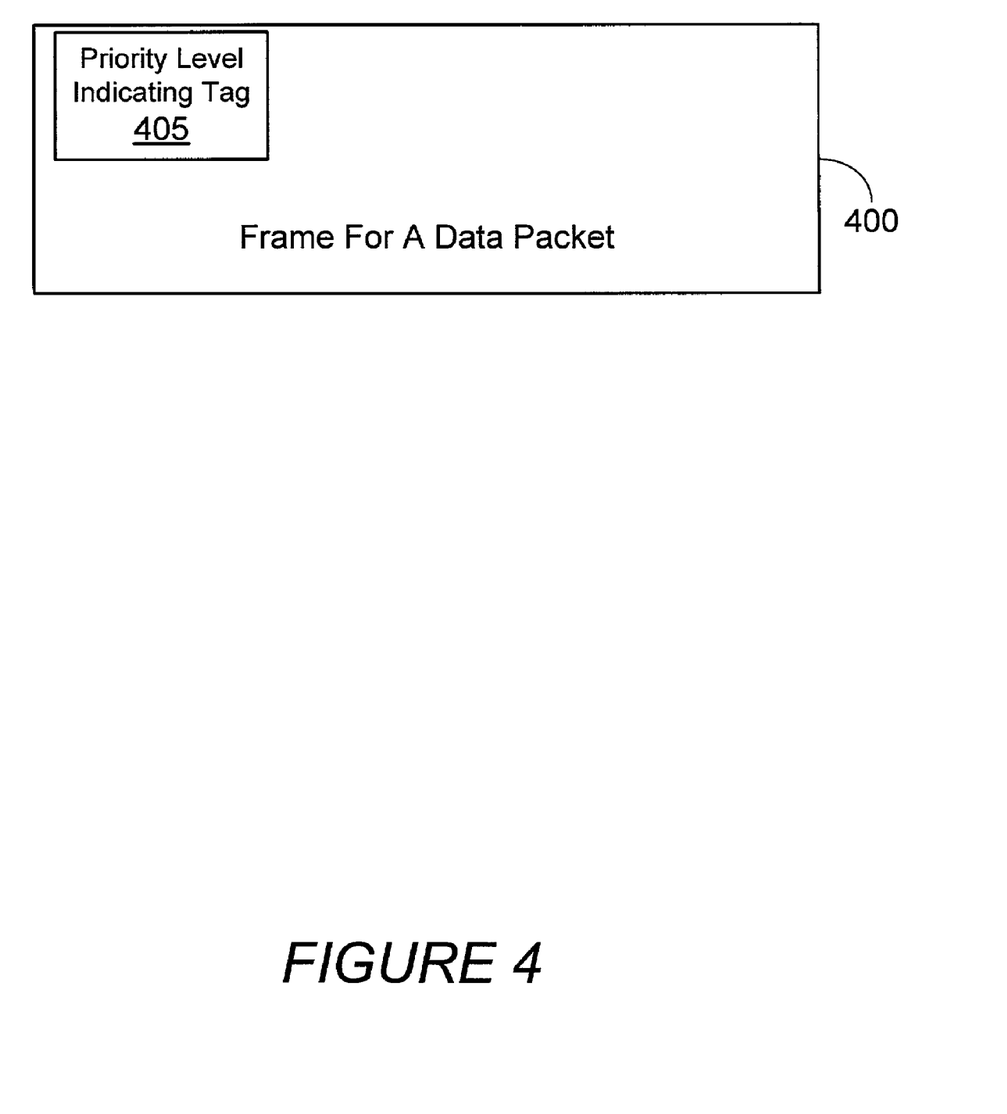
FIG. 4 illustrates an exemplary packet with a priority level field.

In general, there are several levels of QoS service corresponding to different tasks. IEEE 802.11p specification, incorporated herein in its entirety, provides eight levels of priority. The handling of a packet reflects the QoS associated with the packet, which in general is the QoS associated with the particular task requiring transmission of the packet. In an exemplary embodiment of the invention a representation of the assured QoS for a wireless packet is included in the packet itself. Accordingly, FIG. 4 illustrates an exemplary packet 400 with a field 405 coded with the assigned QoS as a priority level tag. In order to include a particular value for the tag, the QoS request must be first approved along the entire path to ensure end-to-end QoS.

A default value of the priority level tag corresponds to "best effort." Best effort refers to packet transmission if during that slice of time free bandwidth is available. Each node or subnet may decide whether resources are available for best effort services in accordance with its own bookkeeping procedures. Even if a QoS assurance higher than "best effort" is not available for a packet, unused capacity may be available because extra bandwidth is reserved to provide a cushion when allocating resources to meet QoS guarantees. However, transmitting a packet from a node in accordance with best effort does not result in transmitting with best effort priority at each subsequent node in the path. Each node along the path makes its transmission decisions independently.

With multiple levels of QoS, it is possible to maintain independent queues such that packets with the same priority level are in the same queue. Transmitting packets in a queue in preference to another queue further provides QoS assurances. For instance, packets allowed only a best effort priority are placed in a separate queue. Moreover, the access point 200 of FIG. 2 serves as a gatekeeper that allows access only when there is room in a suitable queue. In other words, a task tags packets with a requested priority level only when the requested QoS can be honored and in the absence of capacity access itself may be denied to a user or application at an access point. A mobile user seeking a network connection via the access point 200 is provided access with "best effort" level of service if the wireless link has no capacity to spare. In alternative embodiments, a similarly situated mobile user is, for example, denied service.

Figure 5:
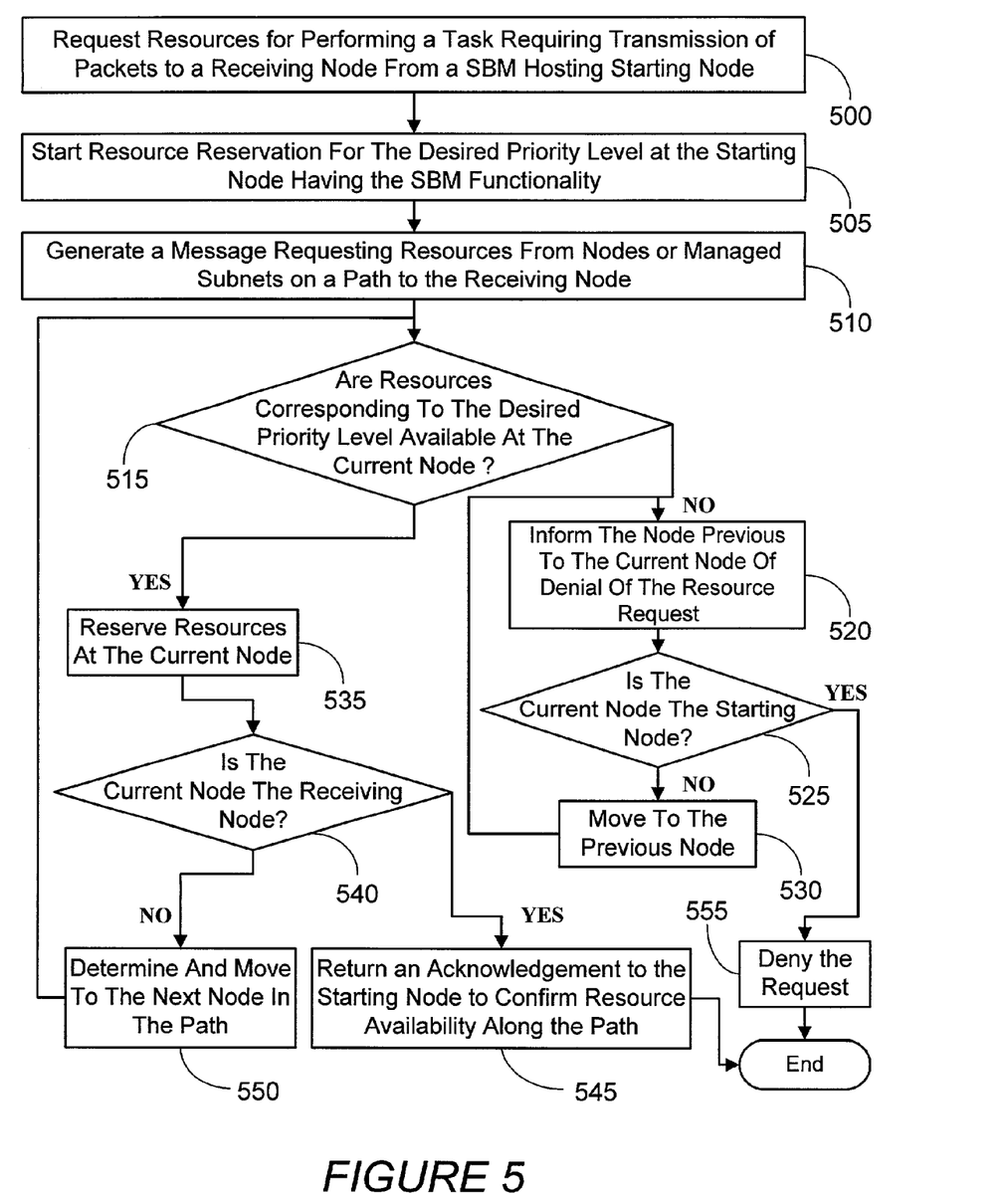
FIG. 5 illustrates exemplary steps in a method for reserving resources for honoring a requested QoS.

FIG. 5 illustrates exemplary steps in a method for reserving resources for honoring a requested QoS. The QoS negotiation need not take place for each packet, but rather for an entire task executed by an application or user and of specified or unknown duration. Packets sent in the course of carrying out the task are tagged with the requested priority level if the QoS request is approved. An application or user desiring to send packets to a receiving node requests, during step 500, a QoS necessary or sufficient for the intended purpose from a bandwidth-managing module at the starting node. For instance, bandwidth, memory resources, time delay introduced by the node and many other considerations are possible parameters in a QoS request. The starting node also specifies, during step 500, the receiving node for the packets to be sent. The starting node hosts QoS handling mechanisms such as RSVP and Packet Scheduler. Typically in a wireless network the access point (AP) or a base station hosts a subnet bandwidth manager (SBM) functionality for managing resources across the shared wireless media. Typically the SBM performs the reservation and querying of nodes. In an embodiment of the invention the starting node is also the access point for a wireless link into a network.

Since the nodes in a path are independent, each node needs to be queried to determine whether the resources for honoring the requested QoS are available. Consequently, during step 505 the starting node evaluates and starts the resource reservation. To this end, during step 510, the SBM generates a message requesting resources from nodes or managed subnets on a path terminating at the receiving node. This message allows recording of the path to the receiving node so that an acknowledgment of the QoS assurances is related to a particular path. However, not every node on the path is required to affirmatively agree to the request since some networks in the path may be managed such that a path through them and resources is assured by a management entity and not specific nodes. For example, such a management entity could be an SBM managing such a network.

If the required resources are unavailable at the current node during step 515 then control flows to step 520 to inform the previous node that the QoS request has been denied. At step 525 if the current node is the starting node then control passes to step 555 during which the request of step 500 is denied since the previous node is the user or the application requesting the QoS. On the other hand during step 525 if the current node is not the starting node control passes to step 530. During step 530 the previous node becomes the current node and control returns to step 520.

If the requested resources are available at step 515, then control passes to step 535. The required resources are reserved during step 535. Next, during step 540, the current node determines if it is the receiving node. If the current node is the destination node then during step 545 the task is authorized to tag its packet(s) with the requested priority level tag. This authorization is communicated to the task by returning an acknowledgment message to the starting node. The QoS handling mechanism at the starting node assigns the priority level tag, or alternatively in the case of an embodiment of the invention where the starting node is also the access point for a wireless link into a network, the SBM approves a requested tag value. Subsequent packets include the priority level tag to indicate their assured QoS. Typically, there are at least three available priority level tags. The tag values may correspond to real-time tasks or time limited tasks or even best effort tasks.

If the current node is not the receiving node then additional nodes in the path need to be queried. Accordingly, control passes from step 540 to step 550. During step 550 the current node is moved to the next node in the path and control is passed to step 515.

Figure 6:
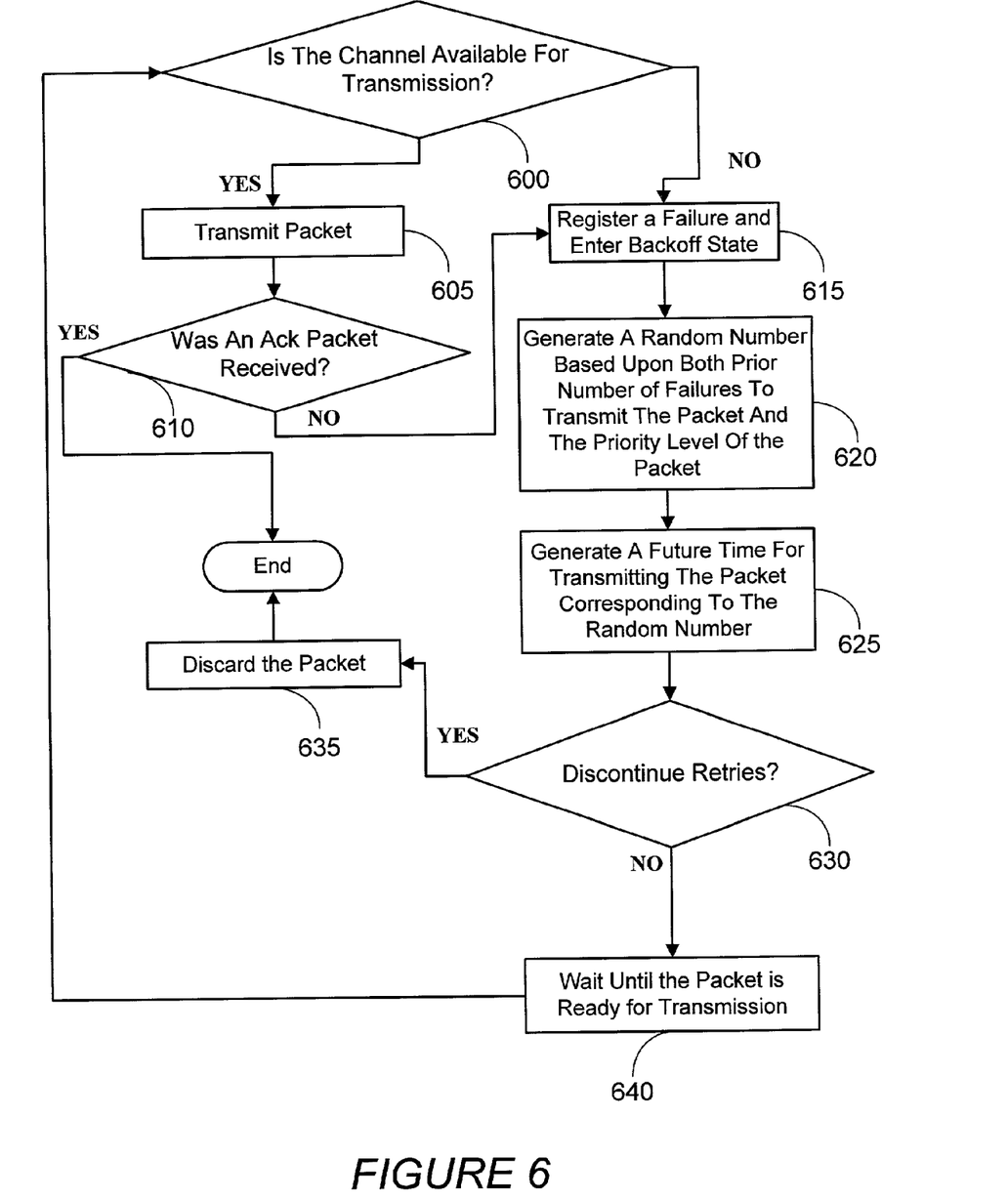
FIG. 6 illustrates transmission of a packet with collision avoidance using a stochastic scheme that manages transmission of packets having different priority levels and failed transmission attempts.

After the allocation of QoS, transmission of a packet in accordance with the invention includes collision avoidance using a stochastic scheme described in FIG. 6. During step 600 a node ready to transmit the packet listens first to determine whether the medium is free for a predetermined interval. The predetermined interval is based on default values and, possibly, the assigned QoS. In an embodiment of the invention the receiving node transmits a 'ready to receive signal' to indicate to potential transmitting nodes that a node, not necessarily detectable by other nodes, as illustrated in FIG. 3, is ready to transmit. The receipt of the 'ready to receive' signal indicates to the other nodes that the medium is occupied for a stated duration even if they cannot detect a signal during that duration.

If the medium is available then control passes to step 605 wherein a packet is transmitted. Next, during step 610 if an acknowledgment is not received within a time interval then control passes to step 615. It should be noted that an alternative embodiment of the invention does not treat the failure to receive an acknowledgment during step 610 in the same manner as a failure to transmit due to a collision. For instance, in such an embodiment no failure is registered during step 615. In the exemplary embodiment described in FIG. 6, during step 615, a failure is registered and the packet enters a backoff state. The backoff state introduces a delay prior to re-transmitting the packet in order to avoid collisions.

If the channel is not available during testing in step 600, the control passes to step 615. During step 615 the node enters a "backoff" state, registers a failure and generates a time delay after a currently busy channel becomes free before attempting transmission of the current packet. The time delay is a function of the priority level of the packet and the number of failed transmission attempts. One strategy for achieving this for packets with several priority levels is described next. However, the strategy described herein is not intended to be a limitation on the scope of the invention.

Next, during step 620 a random delay within a time interval, also termed a contention window, is generated. In an embodiment of the invention where all priorities have a same delay the time interval size (referred to as CW herein below) is a function of the priority level of the packet and the number of prior failed transmission attempts for the packet. In an embodiment of the invention, higher priority packets have delays generated within smaller intervals in comparison with lower priority packets having the same number of prior failures. Alternatively or in addition, higher priority packets have a smaller minimum delay value. As a result, the randomly generated delay for a higher priority packet has a greater probability of being less than a lower priority packet that has experiences similar transmission failures. For instance the following choices for contention windows are able to handle both multiple priority levels and failed transmission attempts.

The pseudorandom integer is drawn from a uniform distribution over the interval [0, CW], where contention window (CW) parameter ranges from a minimum value of $aCW_{min}$ and a maximum value of $aCW_{max}$. The CW parameter takes an initial value of $aCW_{min}$ that is incremented upon each consecutive unsuccessful transmission attempt by a STA until it reaches the maximum value of $aCW_{max}$. CW is again reset to $aCW_{min}$ after every successful transmission or if a transmission is aborted.

The minimum and maximum values of the CW parameter are varied to ensure that backlogged higher priority frames have statistically a greater probability of transmission over similarly backlogged lower priority frames. IEEE 802.1p tag provides one of eight priority levels ranging from 0 at the lowest priority level to 7 for the highest priority level. The embodiment of the invention in FIG. 6 provides for each of the priority levels a distinct set of $aCW_{min}$ and $aCW_{max}$ values in accordance with the following relationship:

$aCW_{min\ i} > aCW_{min\ j}$, where priority level i<priority level j $aCW_{max\ i} > aCW_{max\ j}$, where priority level i<priority level j The monotonic decrease in the $aCW_{min}$ and $aCW_{max}$ values for increasing priority levels ensures that higher priority backlogged frames have a higher probability of transmission over similarly backlogged lower priority frames, i.e., those having a same number of prior failures to transmit because the channel was not free.

Following the generation of the random number, during step 625 the STA calculates a time delay from the random number obtained during step 620 to get a future time for transmitting the packet. Moreover, each packet has a time to live and handling the packet if it has exceeded its time to live is a waste of resources. Accordingly, control passes to step 630 from step 625.

During step 630, a decision is made as to whether it is productive to continue to retry sending the packet. For instance, for a voice packet requiring real-time transmission the future time for transmitting the packet may exceed a time to live for the packet. Then control flows to step 635 since there is no need to transmit a packet that is no longer useful. Alternatively, if the packet is still useful then control flows to step 640 for waiting until the packet is ready for transmitting again. Following the waiting step control flows to step 600 for retrying transmission of the packet.

The above described contention resolution scheme is coupled with a scheme for queuing packets waiting to be transmitted by a particular station. Embodiments of the invention employ a variety of buffer management strategies while a packet is waiting to be transmitted. For instance, a packet with higher priority than a packet waiting during step 640 may be transmitted if the higher priority packet has a shorter wait time even if it results in the superseded packet being forced into another backoff state. Moreover, a packet having a lower priority may transmit earlier than a packet with higher priority if the time to live for the lower priority packet would result in the lower priority packet being discarded otherwise. Such transmission is subject to satisfying the requirements of the higher priority packet. The invention is not intended to be limited by such local buffer management strategies.

Another feature of the exemplary embodiment of invention is the queuing packets for transmission based on the priority tag value assigned to each packet. Transmitting a packet from the head of the highest priority queue reduces the overhead in managing packets with different priority tag values. Such sorting allows a lower priority packet to be transmitted if it is ready for transmission before a higher priority packet has completed its waiting period or has become available for transmission or if the lower priority packet happens to pick a better random number during collision resolution. Moreover, the use of multiple queues allows wireless transmission and the associated failure management to interface efficiently with the multiple priority levels used by the packets on a wired LAN. As described previously, in an embodiment of the invention the lower priority traffic is not shut out but rather the higher priority packets are more likely to transmit by suitable manipulation of the ranges for picking random numbers.

Still another feature of the present invention is a computer-readable medium having computer-executable instructions for performing steps, for instance for implementing methods illustrated in FIGS. 5–6.

In view of the many possible embodiments to which the principles of this invention may be applied, it should be recognized that the embodiment described herein with respect to the drawing figures is meant to be illustrative only and should not be taken as limiting the scope of invention. For example, those of ordinary skill in the art will recognize that elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

All of the references cited herein, including patents, patent applications, and publications, are hereby incorporated in their entireties by reference.

We claim:

1. A method for transmitting a packet over a path comprising at least one wireless link, the path comprising a sending node and a receiving node, the method comprising:
    specifying a priority level for the packet;
    reserving resources at a node in the path other than the sending node in accordance with a requested level of service;
    detecting, prior to transmitting the packet, the wireless link to be idle for a time interval, the time interval based on at least (1) a number of prior failed attempts to transmit the packet and (2) the specified priority level of the packet; and
    establishing a wireless connection with another node in the path with the use of at least one access point, once the sending node has established a connection with said access point.

2. The method of claim 1 wherein at least one of the prior failed attempts to transmit the packet includes detecting the wireless link to be busy when attempting to transmit the packet.

3. The method of claim 1 further comprising:
    assigning at least a default priority level to the packet.

4. The method of claim 1 further comprising:
discovering, at a node in the path, a next node in the path.

5. The method of claim 1 further comprising:
employing a requested priority level as the priority level of the packet.

6. The method of claim 1 further comprising:
detecting, at a node ready to transmit, a collision with another node;
placing the node ready to transmit into a backoff state in response to detecting the collision with the other node;
generating a randomly generated time delay within a contention window wherein the contention window is augmented if the node ready to transmit has previously failed to transmit the packet; and
waiting for the time delay prior to attempting to transmit the packet from the node ready to transmit.

7. The method of claim 6 wherein if the priority level of the packet is high, then using a smaller contention window for selecting the time delay compared to when the priority level of the packet is low with a similar number of prior failures to transmit at the high and low priority levels, respectively.

8. The method of claim 6 wherein if the priority level of the packet is high, then an upper end of the contention window for selecting the time delay is smaller compared to when the priority level of the packet is low with a similar number of prior failures to transmit at the high and low priority levels, respectively.

9. The method of claim 6 wherein if the priority level of the packet is high, then a lower end of a contention window for selecting the time delay is smaller compared to when the priority level of the packet is low with a similar number of prior failures to transmit at the high and low priority levels, respectively.

10. The method of claim 1 wherein the access point is associated with a subnet bandwidth manager.

11. The method of claim 10 wherein the subnet bandwidth manager associated with the access point decides whether a request for resources from the sending node, the resources including bandwidth over the wireless link, should be honored.

12. The method of claim 10 wherein the subnet bandwidth manager associated with the access point generates a reservation message and forwards the reservation message to a next node in the path.

13. The method of claim 12 wherein if the reservation message can be honored by the next node, based on its policy and already allocated resources, then the next node forwards the reservation message to a node next to the next node in the path.

14. A computer-readable medium having computer-executable instructions for performing a method for transmitting a packet over a path comprising at least one wireless link, the path comprising a sending node and a receiving node, the method comprising:
specifying a priority level for the packet;
reserving resources at a node in the path other than the sending node in accordance with a requested level of service;
detecting, prior to transmitting the packet, the wireless link to be idle for a time interval, the time interval based on at least (1) a number of prior failed attempts to transmit the packet and (2) the specified priority level of the packet; and
establishing a wireless connection with another node in the path with the use of at least one access point, once the sending node has established a connection with said access point.

15. The computer-readable medium of claim 14 wherein at least one of the prior failed attempts to transmit the packet includes detecting the wireless link to be busy when attempting to transmit the packet.

16. The computer-readable medium of claim 14 further comprising computer-executable instructions for:
assigning at least a default priority level to the packet.

17. The computer-readable medium of claim 14 further comprising computer-executable instructions for:
discovering, at a node in the path, a next node in the path.

18. The computer-readable medium of claim 14 further comprising computer-executable instructions for:
employing a requested priority level as the priority level of the packet.

19. The computer-readable medium of claim 14 further comprising computer-executable instructions for:
detecting, at a node ready to transmit, a collision with another node;
placing the node ready to transmit into a backoff state in response to detecting the collision with the other node;
generating a randomly generated time delay within a contention window wherein the contention window is augmented if the node ready to transmit has previously failed to transmit the packet; and
waiting for the time delay prior to attempting to transmit the packet from the node ready to transmit.

20. The computer-readable medium of claim 19 wherein if the priority level of the packet is high, then using s smaller contention window for selecting the time delay compared to when the priority level of the packet is low with a similar number of prior failures to transmit at the high and low priority levels, respectively.

21. The computer-readable medium of claim 19 wherein if the priority level of the packet is high, then an upper end of the contention window for selecting the time delay is smaller compared to when the priority level of the packet is low with a similar number of prior failures to transmit at the high and low priority levels, respectively.

22. The computer-readable medium of claim 19 wherein if the priority level of the packet is high, then a lower end of a contention window for selecting the time delay is smaller compared to when the priority level of the packet is low with a similar number of prior failures to transmit at the high and low priority levels, respectively.

23. The computer-readable medium of claim 14 wherein the access point is associated with a subnet bandwidth manager.

24. The computer-readable medium of claim 23 wherein the subnet bandwidth manager associated with the access point decides whether a request for resources from the sending node, the resources including bandwidth over the wireless link, should be honored.

25. The computer-readable medium of claim 24 wherein the subnet bandwidth manager associated with the access point generates a reservation message and forwards the reservation message to a next node in the path.

26. The computer readable medium of claim 25 wherein if the reservation message can be honored by the next node, based on its policy and already allocated resources, then the next node forwards the reservation message to a node next to the next node in the path.

27. An access point with access to a wireless device via a wireless link, the access point comprising:

a subnet bandwidth manager for reserving resources to support a requested quality of service for a packet and for generating a reservation message to reserve resources at a node other than the access point on a path from the wireless device to a target device, once a sending node has established a connection with said access point; and a first module for detecting the wireless link to be idle for a time interval based on at least (1) a number of prior failed attempts to transmit the packet and (2) a priority level of the packet.

28. The access point of claim 27 wherein the reservation message is an RSVP message.

29. The access point of claim 27 further comprising:

a second module to free previously reserved resources at the access point if a response to the reservation message indicates that at least one node on the path will not honor the requested quality of service.

* * * * *

UNITED STATES PATENT AND TRADEMARK OFFICE
CERTIFICATE OF CORRECTION

PATENT NO.       : 7,079,508 B2                                      Page 1 of 1
APPLICATION NO.  : 09/792765
DATED            : July 18, 2006
INVENTOR(S)      : Ayyagari et al.

It is certified that error appears in the above-identified patent and that said Letters Patent is hereby corrected as shown below:

In column 2, line 43, delete "1," and insert -- 17, --, therefor.

In column 10, line 45, delete "802.11p" and insert -- 802.1p --, therefor.

In column 16, line 32, in Claim 20, delete "s" and insert -- a --, therefor.

Signed and Sealed this

Thirtieth Day of March, 2010

David J. Kappos
*Director of the United States Patent and Trademark Office*